July 7, 1970  J. D. WINSLOW, JR., ET AL  3,519,550
APPARATUS FOR CREATING HIGH-VOLTAGE PULSES
Filed Nov. 20, 1967  2 Sheets-Sheet 1
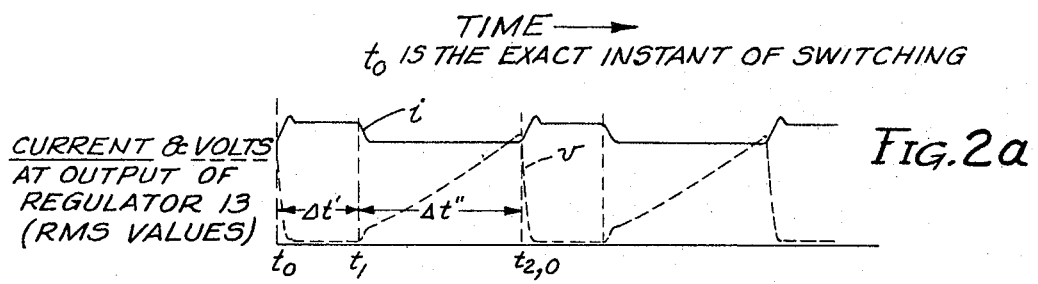
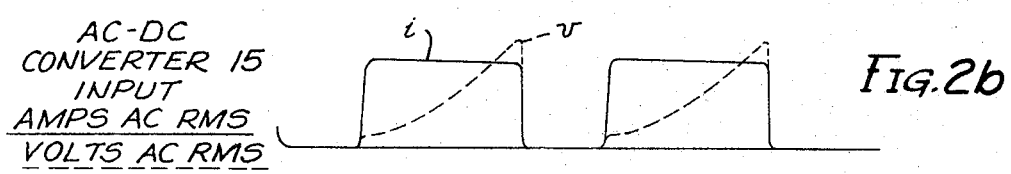
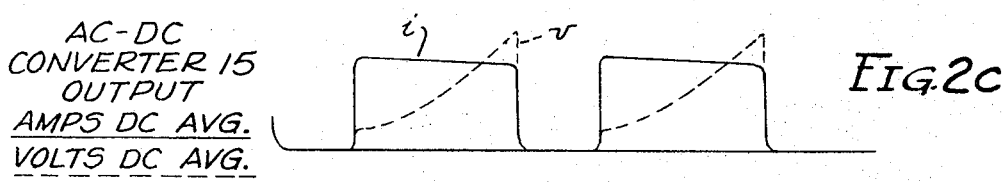
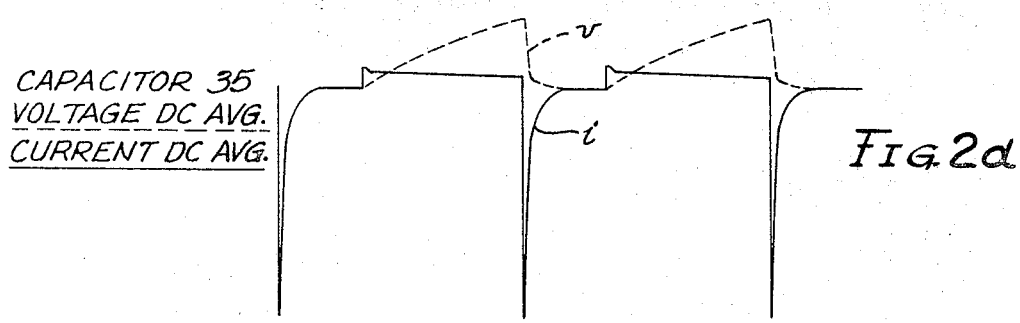
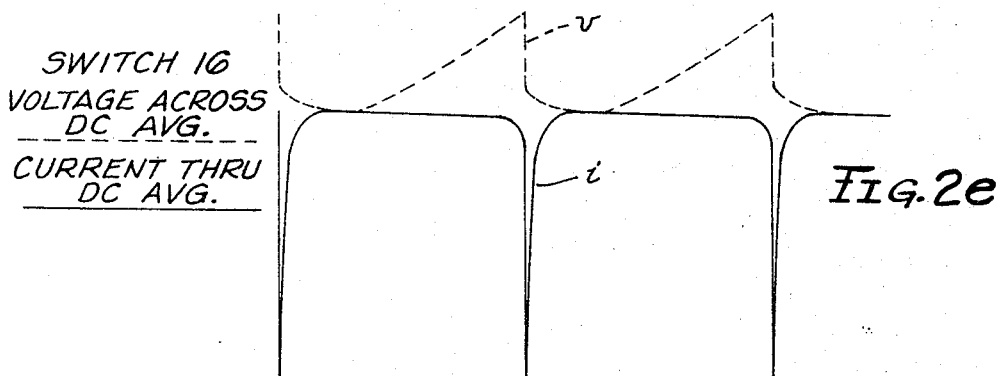
INVENTORS
JOSEPH D. WINSLOW, JR.,
HOMER M. WILSON
BY THEIR ATTORNEYS
HARRIS, KIECH, RUSSELL & KERN

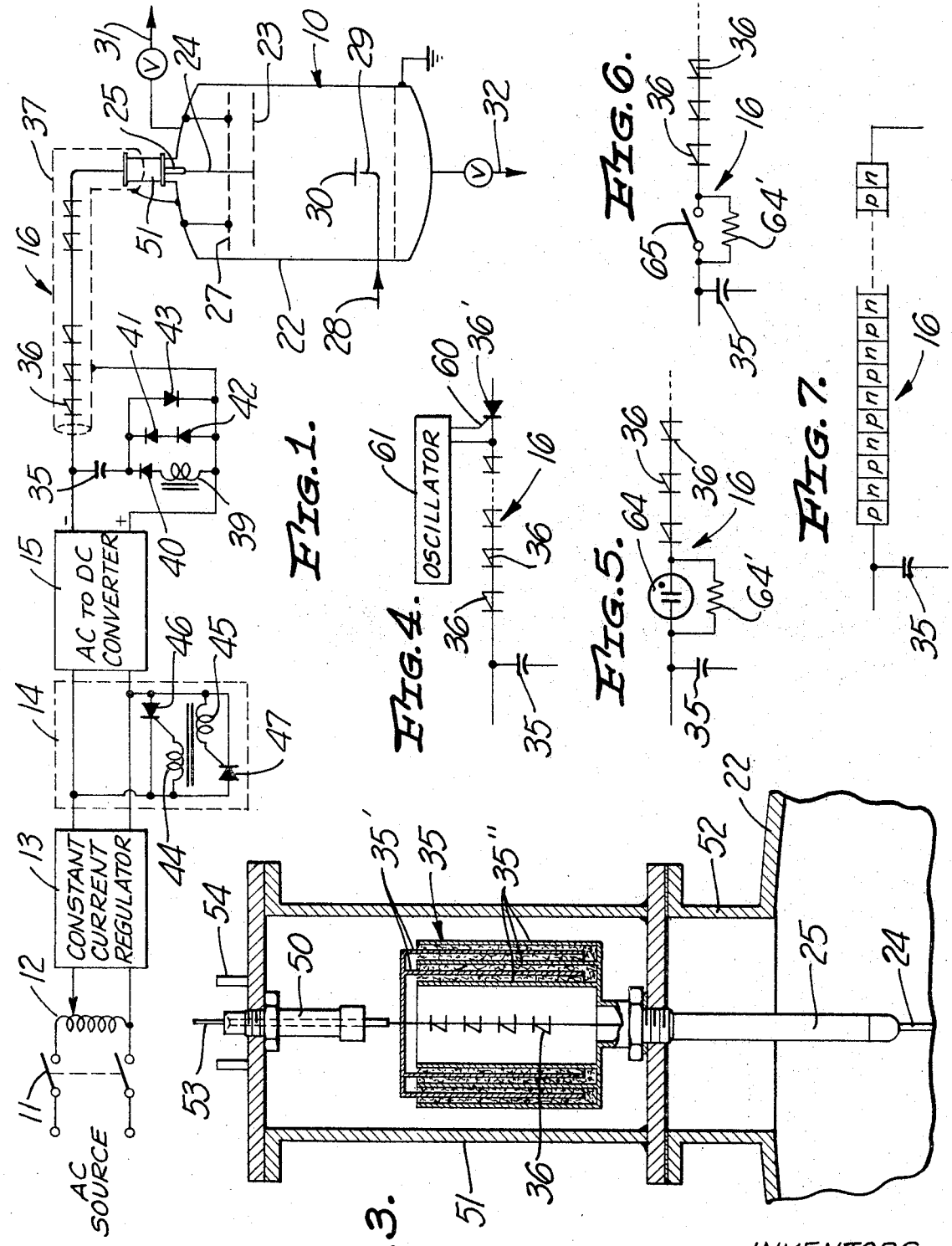

United States Patent Office 3,519,550
Patented July 7, 1970

3,519,550
APPARATUS FOR CREATING
HIGH-VOLTAGE PULSES
Joseph D. Winslow, Jr., and Homer M. Wilson, Houston, Tex., assignors to Petrolite Corporation, St. Louis, Mo., a corporation of Delaware
Filed Nov. 20, 1967, Ser. No. 684,207
Int. Cl. B03c 5/02; H03k 5/00
U.S. Cl. 204—305                                    13 Claims

ABSTRACT OF THE DISCLOSURE

Electric precipitation or treatment of emulsions by high-voltage pulses. Generation of high-voltage pulses by charging a capacitor and discharging the capacitor into the load through a multilayer solid-state switch comprising a plurality of pnpn junctions. Initiation of switch conduction resulting from the magnitude of the switch current corresponding to the overall applied voltage. Initiation of switch conduction resulting from a trigger current applied at one junction.

---

This invention relates to the electric treatment of emulsions or dispersions by high-voltage pulses and to equipment and methods for providing high-voltage pulses suitable for dispersion treatment and other purposes. Dispersions are conventionally resolved by a high-voltage alternating current or direct current electric field established between the electrodes bridged by the dispersion. If the voltage is of sufficient magnitude it will coalesce or agglomerate the dispersed particles into masses of sufficient size to gravitate from the fluid under treatment. The power and kva demand required to effect electrical precipitation or treatment is a function of the instantaneous applied gradient, the resistance of the material being treated, the geometrical configuration of the electrodes and interelectrode spaces, and the duty cycle or form factor of the applied voltage or gradient.

A variety of equipment and methods have been utilized in the electrical treatment of materials. Treatment of materials of high electrical conductivity has been particularly difficult. It is an object of the present invention to provide new and improved apparatus and methods particularly suited for the treatment of the dispersions having relatively high electrical conductivity. Commercial treating usually deals with large volumes of material and high power equipment so that the initial cost, the operating cost and efficiency of operation are important factors in the selection of equipment and methods for generating treating power. It is an object of the invention to provide new and improved apparatus and methods for generating high-voltage pulses, particularly pulses with steep leading edges. A further object is to provide apparatus and methods for efficiently producing the high-voltage pulses with desired and controllable peak values, pulse rates, and wave forms.

The apparatus and method of the invention include charging a capacitor from a DC source and discharging the capacitor into the load via a switch, with the sudden change of the switch from the nonconducting to the conducting condition providing the steep wave front voltage pulse. A new form of switch is an important feature of the invention. It has been found that a plurality of normally nonconductive four-layer pnpn semiconductor devices can be arranged in series, for example, six to twelve such devices, depending upon the breakdown current/voltage characteristic of the individual devices and the peak pulse voltage desired, with the devices being changed to the conducting condition by breakdown current flow through the devices to provide the switch turn-on function. In one arrangement, avalanching is initiated by applying across the switch an overall voltage which exceeds a predetermined value. In another arrangement, avalanching is initiated by apply a trigger voltage across one junction of the many junction switch, while maintaining a high overall voltage across the switch. It is an object of the invention to provide such a new and improved switch. A further object is to provide such a switch which may utilize a plurality of conventional four-layer devices connected in series. An additional object is to provide such a switch which may utilize an integrally formed device comprising a large number of layers to provide the desired voltage operating level.

It is an object of the invention to provide a new and improved electric emulsion treater incorporating such a switch connected in series between a storage capacitor and the electrodes of a treater container, with a DC current source for charging the capacitor. An additional object is to provide such a treater incorporating means for controlling the pulse rate, the peak voltage, and the pulse wave form. A further object is to provide a new and improved coaxial configuration for the switch circuitry.

Other objects, advantages, features and results will more fully appear in the course of the following description. The drawing merely shows and the description merely describes preferred embodiments of the present invention which are given by way of illustration and example.

In the drawings:

FIG. 1 is a diagram illustrating a preferred form of the apparatus of the invention;

FIG. 2 is a set of curves 2a–2e, illustrating the operation of the apparatus of FIG. 1;

FIG. 3 illustrates a coaxial construction for the switching circuitry; and

FIGS. 4–7 are diagrams illustrating alternative forms of the control unit of the apparatus of FIG. 1.

Referring to FIG. 1, an electric treater 10 is energized from an AC power source through an off-on switch 11, a variable transformer 12, a constant current regulator 13, a shunt circuit 14, and AC to DC converter 15, and a switch 16. The construction of the treater itself is not critical to the invention and any conventional emulsion breaking electric treater may be utilized. A typical treater is illustrated incorporating an upright cylindrical container 22 closed at both ends. A set of foraminous electrodes is disposed in a horizontal pattern within the container, including an electrode 23 connected to the switch 16 via a conductor 24 and a feed-through or inlet bushing 25. Another foraminous electrode 27 is disposed above the electrode 23 and is electrically connected to the container 22 which in turn is connected to circuit ground. The fluid to be treated enters via inlet line 28 and is discharged into the container 22 through a nozzle 29 directed upward against a baffle 30. The treated fluid leaves the container through a line 31 and water or other material coalesced by the electric field and separated from the fluid being treated leaves through a line 32.

The variable voltage device 12 may be a conventional auto transformer or a tapped transformer or may be omitted if desired. The constant current regulator 13 may be a conventional constant current transformer or may be an electronically controlled constant current device or may take any other suitable form. The converter 15 provides the high voltage DC power for the treater and typically may comprise a step-up transformer and a full wave rectifier. The converter output is a DC current for charging a capacitor 35.

In the embodiment illustrated, the switch 16 comprises a plurality of four-layer diodes 36 connected in series. The diodes are connected anode to cathode in the series string. Silicon-controlled rectifiers (SCR's) may be used as they are solid-state devices, each comprising a four-layer pnpn semiconductor device, and are commercially available at the present time. The control electrodes of the rectifiers are not utilized in the embodiment of FIG. 1. The specific number of four-layer diodes to be connected in a series string will be dependent upon the current-voltage characteristic of the individual four-layer diode and the overall voltage at which switching is desired. By way of example, if it is desired to have the switch 16 changed to the conducting condition when the charge on the capacitor reaches 20,000 volts, and four-layer diodes which switch into conduction with an applied voltage of 1000 volts are available, twenty such devices will be used in the series string to form the switch.

The devices are brought into conduction by avalanching resulting from application of a high voltage across the device without requiring a triggering or control voltage. With avalanching, conduction is turned on throughout a pn junction at one time without requiring propagation across the junction from a gate or control electrode. This provides an extremely fast turn-on time for the switch and there is considerably less dissipation in the device.

The shunt circuit 14 is not necessary in all applications of the system of the invention, but is advantageously used when the output current from the converter 15 may cause holding current in the solid-state devices after discharge of the capacitor into the treater, and the particular application requires the devices be nonconducting during recharging of the capacitor. The shunt circuit receives a signal during discharge of the capacitor 35 and functions to shut off charging current for a time sufficient for the devices of the switch 16 to go to the zero current condition thereby terminating any holding current. A typical shunt circuit is illusstrated in FIG. 1, while other arrangements can be used where desired.

The primary winding 39 of a coupling transformer and a blocking diode 40 are connected in series with the capacitor 35. Series-connected diodes 41, 42 are connected in parallel with the primary 39 and diode 40. Diode 43 is connected in parallel with the primary 39 and diode 40. The polarity of the diodes is such that the capacitor 35 is charged through diode 43 and discharged through diodes 40, 41 and 42 and the transformer primary 39.

A pulse signal is coupled to secondary windings 44, 45 of the coupling transformer on discharge of the capacitor 35 and one of controlled rectifiers 46, 47 is switched into conduction, providing a low impedance shunt across the input to the converter 15 for the duration of the half cycle. As an alternative to the use of a constant current regulator, the AC supply may be reactance limited so that the temporary shunt does not cause excessive line current.

The operation of the circuitry of FIG. 1 is illustrated in FIG. 2, where the diodes 36 of the switch 16 begin to conduct at time $t_0$ and the shunt 14 closes a very short time thereafter. The shunt stays closed, i.e., one of the rectifiers 46, 47 remains conductive, for the period $\Delta t^1$ and opens at time $t_1$. The current $i$ (FIG. 2a) during the shunting period is slightly greater than that during the subsequent capacitor charging period due to the very low impedance of the shunt.

A typical system may utilize a converter input of 240 volts and 50 amperes AC and a converter output of 20,000 volts peak and 0.5 ampere to provide a pulse output of 16,000 volts peak at 2000 amperes peak, with a 50-microsecond RC decay and a pulse repetition rate up to 5 pulses per second.

In the physical arrangement of the components, it is preferred to have the capacitor 35 coupled to the treater 10 via a coaxial line in order to retain the high-frequency components of the pulse. The electrical components ordinarily will be relatively small in comparison with the container 22 and can readily be assembled in a package for mounting on the treater container. The devices 36 may serve as the inner conductor of a coaxial line between the capacitor 35 and the container 22, with the outer sleeve 37 serving as the ground or second conductor.

A configuration with devices 36 positioned concentrically within a tubular capacitor is illustrated in FIG. 3. The capacitor 35 in the form of concentric sleeves or plates 35' and 35" with a dielectric therebetween is mounted between the treater container bushing 25 and an upper bushing 50, all within a metal sheet 51 mounted on the container bushing pocket 52. The devices 36 are connected in series between the bushings 50, 25 within the capacitor sleeves 35', 35". The upper conductor 53 is connected to the negative output of the converter 15 and the grounded sleeve 54 is connected to the converter positive output. This construction provides a compact coaxial configuration having good high frequency characteristics for the sharp current pulses produced by the switching circuitry.

An alternative arrangement for the switch 16 is illustrated in FIG. 4, where one of the four-layer diodes 36, identified as the device 36', includes a control electrode and is triggered into conduction by an externally applied control voltage connected to the control or gate electrode 60. Typically, all of the devices may be SCR's of the same rating, with one used for control of the others. An oscillator or pulse generator 61 has its output connected to the control electrode and cathode (or anode) of the four-layer device 36' and periodically provides voltage pulses across a junction to trigger the device into conduction. With this arrangement, the timing of the trigger voltage from the oscillator is selected so that the trigger voltage is applied when the voltage charge on the capacitor 35 is such that external triggering of one junction into conduction will result in avalanching of all of the junctions in the switch but not high enough to initiate avalanching without an external trigger as in the embodiment of FIG. 1.

Of course, the external trigger can be applied by various other means such as a manually actuated switch for applying the voltage, a remotely controlled oscillator or switch, a programmed switch or oscillator operation, a voltage-responsive circuit which develops a trigger voltage when the charge on the capacitor reaches a certain level, and the like.

Another alternative arrangement is illustrated in FIG. 5, wherein a voltage-sensitive switch element 64 is connected in series with the devices 36, with a resistance element 64' connected in parallel with the switch element 64. The element 64 may be a spark gap, a gas tube, or the like, which is normally nonconducting and which switches to the conducting condition when the voltage thereacross exceeds a predetermined value. With this arrangement, the switch element 64 is normally open. The element 64' is chosen such that when the voltage at the terminal of the capacitor 35 slightly exceeds the voltage that would cause conduction by avalanching in the series devices 36, a portion of this voltage appears across element 64' sufficient to reduce the voltage across devices 36 to less than that value which causes conduction of devices 36 by avalanching. At this value of the voltage at capacitor 35, the element 64' has the predetermined voltage of 64 across the parallel circuit of 64–64'. Thus 64 switches into conduction, increasing the voltage across series devices 36 to a value sufficient to cause avalanche initiated conduction of devices 36 as in the system of FIG. 1.

An alternative form of the apparatus of FIG. 5 is illustrated in FIG. 6, wherein an externally actuated switch element 65 is substituted for the switch element 64. The element 65 may be a manually operated contactor switch, a triggered gas tube such as an ignitron, an SCR or the like. The operation of the arrangement of FIG. 6 is similar to that of FIG. 5, with the time of discharge of the capacitor 35 being controlled by the actuation of the switch element 65.

Referring again to the embodiment of FIG. 1, it was was indicated that each of the devices 36 is a four-layer pnpn device with an anode and a cathode. However, it is not necessary that individual four-layer devices be used. The primary requirement is that the solid-state device have at least four layers of semiconductor material and that it have a number of layers sufficient to provide the desired overall voltage corresponding to the breakdown current. A single integral device with many layers can be used and such a device is illustrated in FIG. 7. The operation of the embodiment of FIG. 7 is the same as that of FIG. 1. Also, the embodiment of FIG. 7 can be used in the embodiments of FIGS. 5 and 6. Also, the embodiment of FIG. 7 can be used in series with one controlled rectifier as illustrated in FIG. 4 if desired.

The pulse repetition rate for the system of FIG. 1 can be controlled by controlling the charging rate of the capacitor 35, that is to say, by controlling the length of time required for the voltage charge on the capacitor to reach the threshhold value corresponding to breakdown current at which the switch device assumes a low value of impedance. The capacitor charging rate is readily controlled by varying the output voltage of the variable transformer 12 or by varying the current magnitude of the constant current source. The pulse voltage for the system of FIG. 1 is determined by the avalanche breakdown current-voltage characteristic of the switch. The pulse voltage in the systems of FIGS. 4, 5 and 6 can be controlled by triggering the switch into conduction when the voltage charge on the capacitor reaches the desired value.

A constant current for charging the capacitor 35 is not necessary for the operation of the system but it is desirable. The pulse repetition rate is proportional to the magnitude of the charging current and inversely proportional to the voltage corresponding to the breakdown current of the switch. If the capacitor is to be charged within a fixed period of time to a particular voltage and it is desired to maintain the current amplitude at a minimum throughout the operating cycle, a constant current would also be the minimum necessary current. This would permit the components such as high voltage transformer and rectifiers to have a minimum rating and thus reflect a saving in cost and size.

While the high voltage solid-state switch has been disclosed above for providing steep wave front pulses for an emulsion treater, it should be understood that the switch can be used to generate high voltage pulses for other loads as well, such as transducers for creating acoustical signals, for seismic work, and the like.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In an electric emulsion treater, the combination of:
   a source of DC current;
   a capacitor;
   first circuit means connecting said source to said capacitor for charging said capacitor;
   a container for fluid to be treated and including an inlet and upper and lower outlets for fluid flow therethrough;
   a pair of electrodes disposed in said container in spaced relation for fluid flow therebetween; and
   second circuit means connecting said capacitor to said pair of electrodes for discharging said capacitor through the fluid within said container, said second circuit means including a solid-state control unit connected in series between one plate of said capacitor and one of said electrodes and having a plurality of normally nonconducting four-layer pnpn semiconductor devices, with said control unit blocking capacitor discharge when said devices are in the nonconducting condition and permitting capacitor discharge into said treater when said devices are in the conducting condition.

2. A treater as defined in claim 1 in which said control unit includes a plurality of separate four-layer devices connected in series.

3. A treater as defined in claim 1 in which said plurality of four-layer devices are formed in a single integral multilayer device.

4. A treater as defined in claim 1 including one control electrode connected to one of said seminconductor layers, and means for coupling a control signal to said control electrode to switch said devices to the conducting condition.

5. A treater as defined in claim 1 in which said control unit includes a normally open switch connected in series with said seminconductor devices and means for changing said switch to the closed condition to apply the capacitor charge to said seminconductor devices.

6. A treater as defined in claim 5 in which said switch is a voltage sensitive switch which changes to the closed condition when the voltage thereacross exceeds a predetermined value.

7. A treater as defined in claim 5 in which said switch is externally actuated, and including means for actuating said switch.

8. A treater as defined in claim 1 in which said semiconductor devices are changed from the non-conducting condition to the conducting condition by avalanching resulting from application of the capacitor voltage across the series of seminconductor layers.

9. A treater as defined in claim 1 in which said second circuit means includes a coaxial arrangement between said capacitor and said treater with said seminconductor devices connected in the inner conductor and with the outer conductor connecting the other plate of said capacitor and the other of said electrodes.

10. A treater as defined in claim 1 in which said capacitor comprises at least two concentric spaced plates with said seminconductor devices positioned within said plates.

11. A treater as defined in claim 10 including means for mounting said capacitor and seminconductor devices within a grounded electrically conducting shell carrier on said contanier.

12. A treater as defined in claim 2 in which said second circuit means includes a coaxial arrangement between said capacitor and said treater with said seminconductor devices connected in the inner conductor and with the outer conductor connecting the other plate of said capacitor and the other of said electrodes, with said semiconductor devices being changed from the nonconducting condition to the conducting condition by avalanching resulting from application of the capacitor voltage across the series of devices, with no separate control element.

13. A treater as defined in claim 1 including:
   shunt circuit means for temporarily reducing the output of said source to substantially zero; and
   shunt control means connected in circuit with said capacitor for switching said shunt circuit means to reduce the current output following discharge of said capacitor.

References Cited

UNITED STATES PATENTS 2,096,774   10/1937   Wolfe _____ 204—305 XR

JOHN H. MACK, Primary Examiner

D. R. VALENTINE, Assistant Examiner

U.S. Cl. X.R.

307—260